US010293521B2

(12) United States Patent
Bai et al.

(10) Patent No.: US 10,293,521 B2
(45) Date of Patent: May 21, 2019

(54) BIDIRECTIONAL FREEZE CASTING FOR FABRICATING LAMELLAR STRUCTURES

(71) Applicants: Hao Bai, Berkeley, CA (US); Yuan Chen, Beijing (CN); Benjamin Delattre, Berkeley, CA (US); Antoni P. Tomsia, Pinole, CA (US)

(72) Inventors: Hao Bai, Berkeley, CA (US); Yuan Chen, Beijing (CN); Benjamin Delattre, Berkeley, CA (US); Antoni P. Tomsia, Pinole, CA (US)

(73) Assignee: The Regents of the University of California, Oakland, CA (US)

( * ) Notice: Subject to any disclaimer, the term of this patent is extended or adjusted under 35 U.S.C. 154(b) by 201 days.

(21) Appl. No.: 15/225,580

(22) Filed: Aug. 1, 2016

(65) Prior Publication Data
US 2017/0100857 A1   Apr. 13, 2017

Related U.S. Application Data

(60) Provisional application No. 62/240,664, filed on Oct. 13, 2015.

(51) Int. Cl.
| | | |
|---|---|---|
| B29C 39/00 | (2006.01) | |
| B29C 39/38 | (2006.01) | |
| B22F 3/22 | (2006.01) | |
| B28B 1/00 | (2006.01) | |
| B29L 31/10 | (2006.01) | |
| B29K 509/00 | (2006.01) | |

(52) U.S. Cl.
CPC .............. *B29C 39/38* (2013.01); *B22F 3/222* (2013.01); *B28B 1/007* (2013.01); *B29C 39/003* (2013.01); *B29K 2509/14* (2013.01); *B29L 2031/10* (2013.01)

(58) Field of Classification Search
CPC .......................................................... B22F 3/22
See application file for complete search history.

(56) References Cited

U.S. PATENT DOCUMENTS 4,422,937 A * 12/1983 Connolly ............... B01D 35/28
                                                                    209/264
9,065,093 B2   6/2015 Chiang et al.
(Continued)

OTHER PUBLICATIONS

Bouville et al., "Strong, tough and stiff bioinspired ceramics from brittle constituents," 2014, Nature Materials 13, pp. 508-515. (Year: 2014).*

(Continued)

*Primary Examiner* — Robert A Vetere (57) ABSTRACT

This disclosure provides systems, methods, and apparatus related to freeze casting. In one aspect, a method comprises providing an apparatus. The apparatus comprises a container and a cooling surface. A bottom of the container comprises a wedge. The wedge comprises a first substantially planar surface and a second substantially planar surface with an angle between the first and the second substantially planar surfaces. An interior bottom of the container comprises the second substantially planar surface. The cooling surface is in contact with the first substantially planar surface. A slurry is deposited on the second substantially planar surface, the slurry comprising a plurality of particles in a liquid. The cooling surface is cooled to cool the slurry at a specified cooling rate.

19 Claims, 10 Drawing Sheets

(56) References Cited

U.S. PATENT DOCUMENTS

2010/0118466 A1* 5/2010 Gorzkowski, III ..... B28B 1/007
361/301.1
2015/0364753 A1 12/2015 Chiang et al.

OTHER PUBLICATIONS

Porter et al., "Bioinspired Scaffolds with Varying Pore Architectures and Mechanical Properties," 2013, Adv. Funct. Mater. 24, pp. 1978-1987. (Year: 2013).*

H. Bai et al., "Bioinspired large-scale aligned porous materials assembled with dual temperature gradients," Science Advances, Dec. 11, 2015, vol. 1, No. 11, e1500849.

H. Bai et al., "Bioinspired Hydroxyapatite/Poly(methyl methacrylate) Composite with Nacre-Mimetic Architecture by a Bidirectional Freezing Method," Adv. Mater., 28: 50-56, 2016.

B. Delattre et al., "Unidirectional Freezing of Ceramic Suspensions: In Situ X-ray Investigation of the Effects of Additives," ACS Appl. Mater Interfaces, 2014, 6 (1), pp. 159-166.

W. Suchanek et al., "Processing and properties of hydroxyapatite-based biomaterials for use as hard tissue replacement implants," J. Mater. Res. 1998, 13, 94.

S. Deville et al., Freezing as a path to build complex composites. Science 311, 515-518 (2006).

S. Deville et al., Ice-templated porous alumina structures. Acta Mater 55, 1965-1974 (2007).

M. M. Porter et al., Bioinspired scaffolds with varying pore architectures and mechanical properties. Adv. Funct. Mater. 24, 1978-1987 (2014).

S. Deville et al., In situ X-ray radiography and tomography observations of the solidification of aqueous alumina particle suspensions—Part I: Initial instants. J. Am. Ceram. Soc. 92, 2489-2496 (2009).

E. Munch et al., Architectural control of freeze-cast ceramics through additives and templating. J. Am. Ceram. Soc. 92, 1534-1539 (2009).

F. Bouville et al., Templated grain growth in macroporous materials. J. Am. Ceram. Soc. 97, 1736-1742 (2014).

* cited by examiner

BIDIRECTIONAL FREEZE CASTING FOR FABRICATING LAMELLAR STRUCTURES

RELATED APPLICATIONS

This application claims priority to U.S. Provisional Patent Application Ser. No. 62/240,664, filed Oct. 13, 2015, which is hereby incorporated by reference.

STATEMENT OF GOVERNMENT SUPPORT

This invention was made with government support under Contract No. DE-AC02-05CH11231 awarded by the U.S. Department of Energy and under Grant No. R01 DE015633 awarded by the National Institutes of Health. The government has certain rights in this invention.

TECHNICAL FIELD

This disclosure relates generally to lamellar structures and more particularly to apparatus for and methods of fabricating lamellar structures.

BACKGROUND

Natural materials, such as bone, teeth, shells, and wood, show outstanding properties despite being porous and made of weak constituents. The reason usually lies in their sophisticated hierarchical architecture ranging from nano/microscopic to macroscopic levels. Such architectures have been perfected over the past billions of years, resulting in materials that are very often strong, tough, and lightweight, and serve as a source of inspiration for every materials designer.

Porous ceramic structures, in particular, are desirable for a wide range of applications in areas such as supported catalysis, scaffolds for tissue engineering, foams, fuel cell electrodes, filters for water purification, and many others. Multiple techniques, such as replica, direct foaming, or sacrificial templating, have been developed to manufacture such scaffolds. Most recently, three-dimensional (3D) printing has also been used as an alternative technique. However, these techniques have several limitations because they are often time-consuming or size-limiting processes, not environmentally friendly, too costly, or do not allow precise control over the final structure. An ideal strategy for engineering pores in materials in a more controllable way and at a larger scale has yet to be developed.

Freeze casting can overcome many of these previous limitations. This promising technique enables assembly of ceramic particles into scaffolds that have a highly aligned 3D porous network. The technique uses lamellar ice crystals as a template to assemble building blocks for making biomimetic scaffolds or composites. It offers the advantage of being applicable to a wide spectrum of materials (e.g., such as ceramics, polymers, and/or metals) having various shapes (e.g., particles, nanowires, and ceramic platelets, or graphene sheets). In addition, the technique is environmentally friendly, with water usually being used as the solvent. Finally, easy control of the structural features at multiple length scales is achievable by modifying ice crystal morphology with additives and/or the cooling rate.

Nevertheless, in the case of conventional freeze casting (also referred to as "ice templating" or "unidirectional freezing"), the slurry starts freezing under a single temperature gradient, causing the nucleation of ice to occur randomly on the cold finger surface. As a result, multiple small-size (e.g., submillimeter scale) domains, that is, various ice crystal orientations in the plane perpendicular to the freezing direction, are observed. Despite a pressing demand for the development of new processing techniques that can build large-scale porous aligned lamellar structures, this limitation severely hinders the scale-up fabrication of layered structures aimed for larger applications.

SUMMARY

Described herein is a bidirectional freezing technique which can assemble small building blocks (e.g., ceramic particles, platelets, and/or polymers) into a large-size single-domain (e.g., centimeter-scale) porous lamellar structure comparable to natural nacre, albeit without the "mortar." This can be achieved through control of nucleation of crystals comprising a liquid (e.g., ice crystals) and growth of the crystals under a temperature gradient having a vertical component and a horizontal component generated by covering the cold finger with a wedge (e.g., a polydimethylsiloxane (PDMS) wedge) having different slopes. This technique can applied to ceramic, metallic, or polymeric materials of any shape. This approach could provide an effective way of designing and manufacturing novel, bioinspired, structural materials, in particular advanced materials, such as composites, where a higher level of control over the structure is needed.

One innovative aspect of the subject matter described in this disclosure can be implemented in a method including providing an apparatus. The apparatus comprises a container and a cooling surface. A bottom of the container comprises a wedge. The wedge comprises a first substantially planar surface and a second substantially planar surface with an angle between the first and the second substantially planar surfaces. An interior bottom of the container comprises the second substantially planar surface. The cooling surface is in contact with the first substantially planar surface. A slurry is deposited on the second substantially planar surface, the slurry comprising a plurality of particles in a liquid. The cooling surface is cooled to cool the slurry at a specified cooling rate. Crystals comprising the liquid first nucleate at a first end of the wedge, with the first end of the wedge comprising a thinnest region of the wedge. Particles of the slurry are expelled from the crystals as the crystals grow and a lamellar scaffold having a single domain is formed.

In some implementations, the first end of the wedge has a first thickness, a second end of the wedge has a second thickness, the first thickness is less than the second thickness, and the first thickness increases linearly to the second thickness. In some implementations, the angle between the two substantially planar surfaces is about 1° to 40°.

Another innovative aspect of the subject matter described in this disclosure can be implemented in an apparatus including a container operable to hold a slurry and a cooling surface in contact with an exterior surface of a bottom of a container. The bottom of the container has a first thickness at a first side of the container. A thickness of the bottom of the container increases linearly to a second thickness at a second side of the container. The first thickness is less than the second thickness.

In some implementations, the bottom includes an interior surface of the bottom of the container. The exterior surface and the interior surface of the bottom of the container are both substantially planar, with an angle between the exterior surface and the interior surface.

Another innovative aspect of the subject matter described in this disclosure can be implemented in an apparatus including a container and a cooling surface. A bottom of the container comprises a wedge. The wedge comprises a first substantially planar surface and a second substantially planar surface with an angle between the first and the second substantially planar surfaces. An interior bottom of the container comprises the second substantially planar surface. The cooling surface is in contact with the first substantially planar surface.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention. Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 90% of the targeted value, within 95% of the targeted value, or within 99% of the targeted value.

Figure 1A:
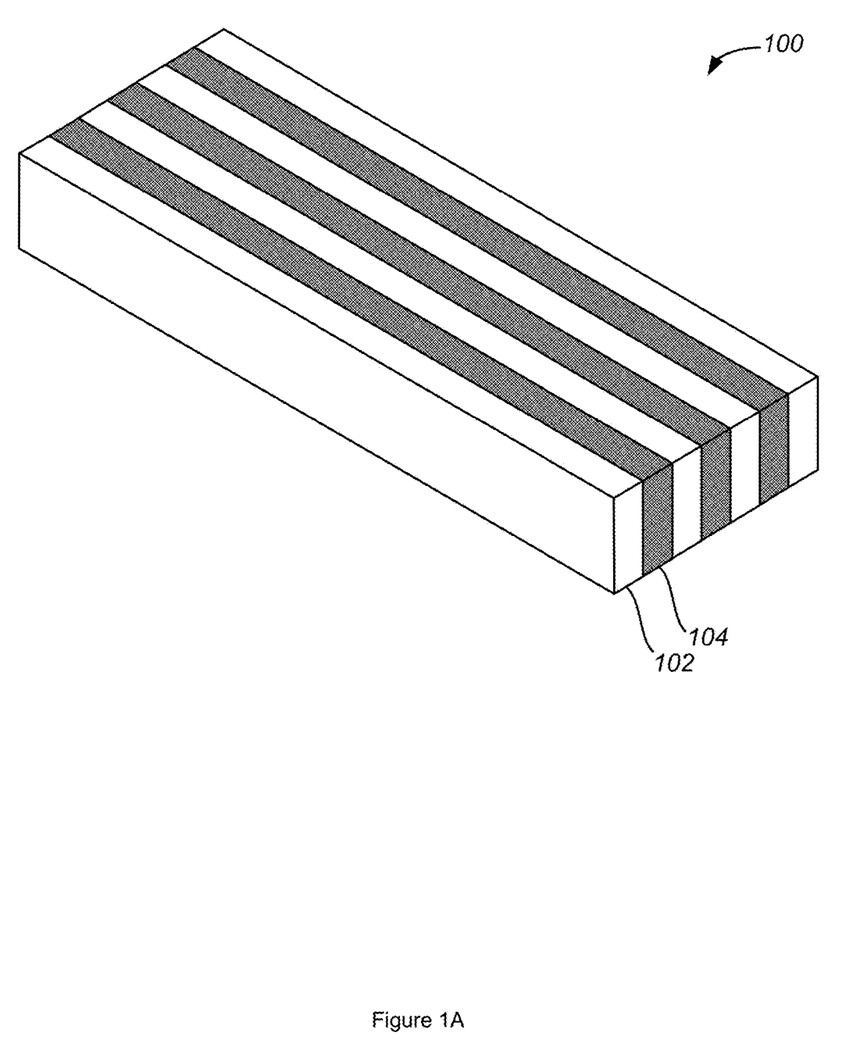
FIG. 1A shows an example of a schematic illustration of a lamellar structure.

Lamellar structures or microstructures are generally composed of fine, alternating layers of different materials in the form of lamellae (i.e., a small plate or flake). FIG. 1A shows an example of a schematic illustration of a lamellar structure. A lamellar structure 100 shown in FIG. 1A includes alternating layers of a first material 102 and a second material 104.

Figure 1B:
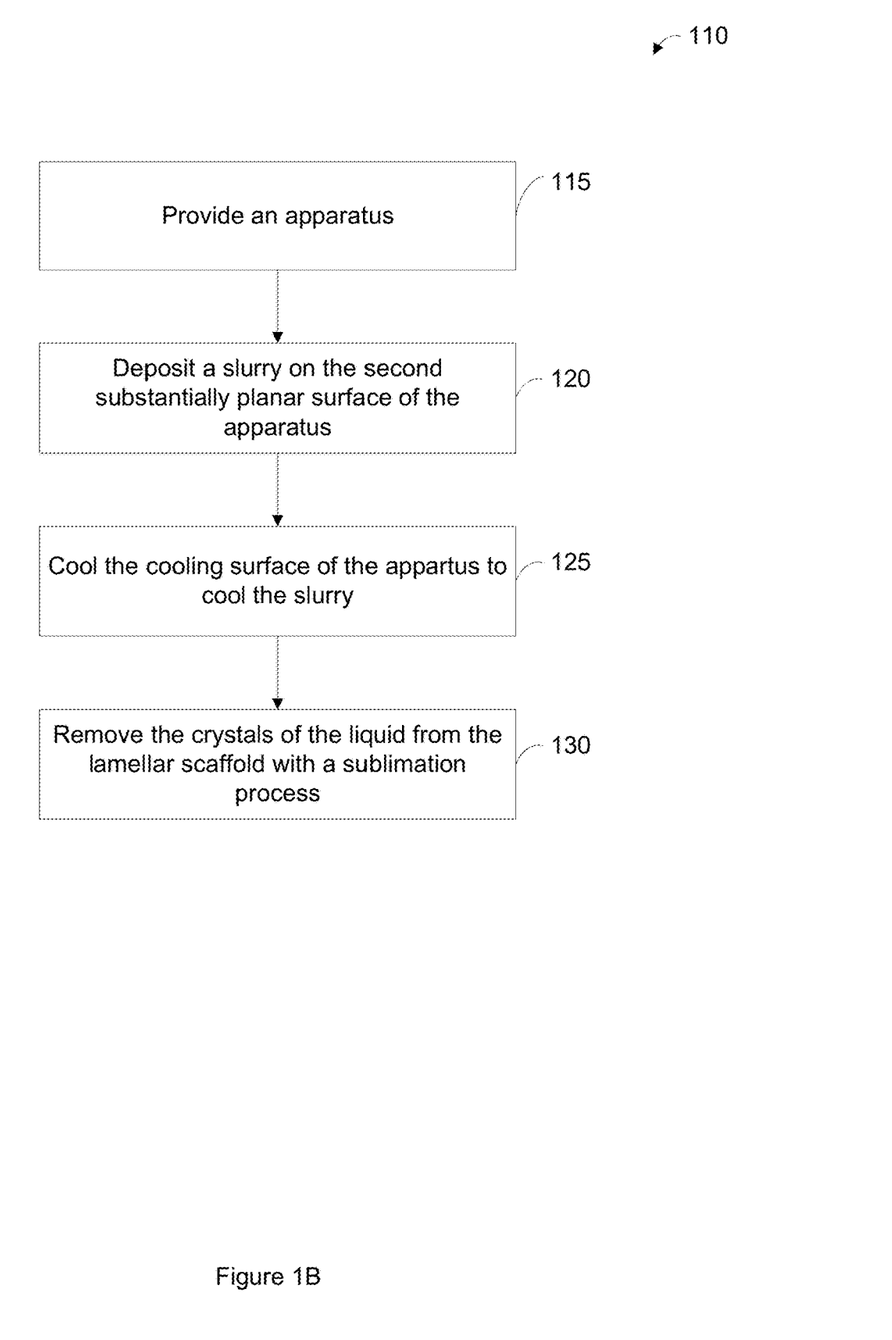
FIG. 1B shows an example of a flow diagram illustrating a manufacturing process for a lamellar scaffold having a single domain.

FIG. 1B shows an example of a flow diagram illustrating a manufacturing process for a lamellar scaffold having a single domain. A lamellar scaffold having a single domain may also be referred to as a monodomain lamellar scaffold. In the description of the method 110 shown in FIG. 1B and the method 200 shown in FIG. 2, the term "lamellar scaffold" is generally used to describe a set of layers of a first material. After formation of a lamellar scaffold of a first material, the lamellar scaffold can be infiltrated with a second material to form a composite material having a lamellar structure; i.e., alternating layers of the first material and the second material. The manufacturing process described with reference to FIG. 1B is referred to as bidirectional freeze casting in the examples below.

Figure 1C:
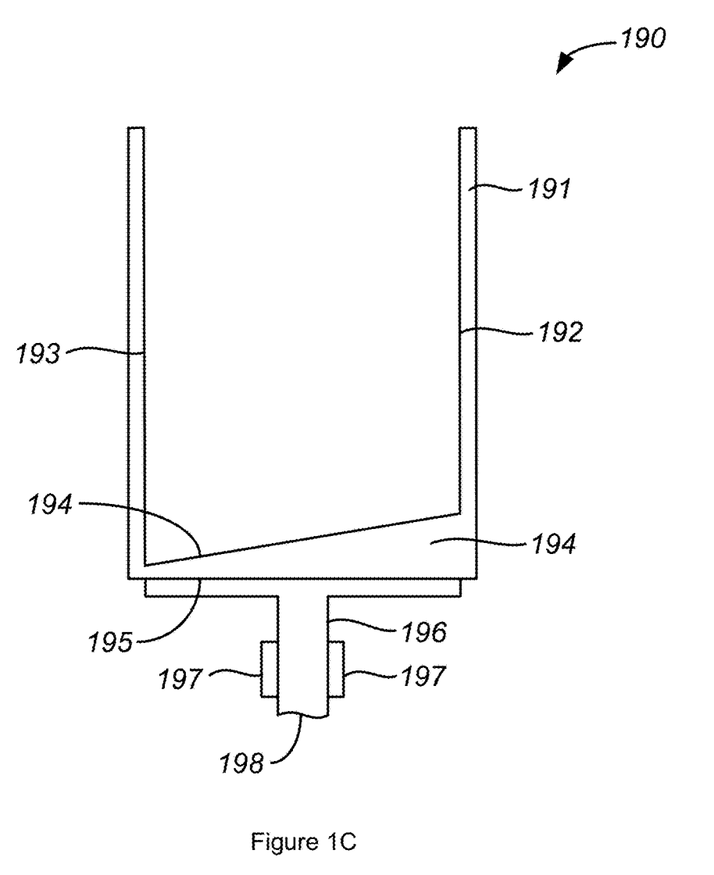
FIGS. 1C and 1D show examples of schematic illustrations of an apparatus that can be used to perform the methods described herein.
Figure 1D:
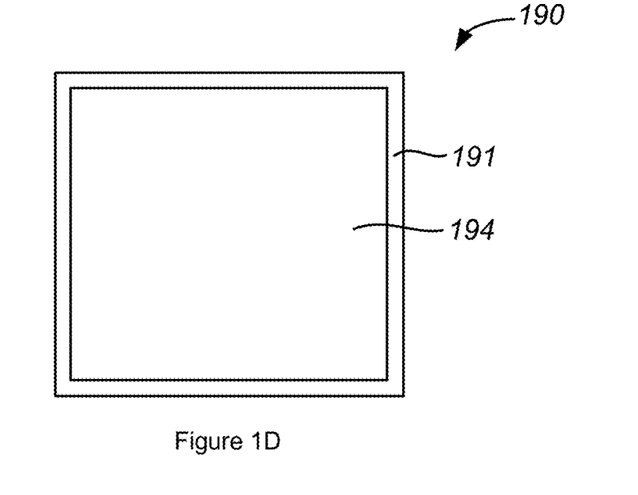

Starting at block 115 of the method 110 shown in FIG. 1B, an apparatus is provided. FIGS. 1C and 1D show examples of schematic illustrations of an apparatus that can be used to perform the methods described herein. FIG. 1C shows an example of a cross-sectional schematic illustration of an apparatus. FIG. 1D shows an example of a top-down illustration of an apparatus. As shown in FIGS. 1C and 1D, an apparatus 190 includes a container 191 and a cold finger 196 in contact with a bottom of the container 191. The container 191 is operable to contain a slurry. A slurry is generally considered to be a semiliquid mixture comprising a plurality of particles of a material suspended or dispersed in a liquid. For example, as shown in FIGS. 1C and 1D, the container 191 may have 5 sides. A slurry may be poured or injected into the container 191 through an open end of the container 191.

The container 191 may be fabricated from any of a number of different materials. In some embodiments, the container 191 comprises a polymer, such as polytetrafluoroethylene (PTFE), for example.

The bottom of the container 191 comprises a wedge 194. A wedge may be defined as a piece of a material having one thick end and tapering to a thin edge. As shown in FIG. 1C, the wedge 194 comprises two substantially planar surfaces with an angle between the two substantially planar surfaces. In some embodiments, the angle is about 1° to 40°, about 1° to 25°, or about 5° to 20° between the two substantially planar surfaces. A first substantially planar surface 195 is part of the exterior of the container 191, and a second substantially planar surface 199 is part of the interior of the container 191. As shown in FIG. 1C, in some embodiments, the wedge 194 may be an integral part of the container 191. For example, the wedge 194 could be fabricated as part of the container 191 by forming the bottom of the container in the shape of a wedge. In some embodiments, an interior of the bottom of the container may be a flat surface, and a wedge 194 may be positioned in the container 191.

Figure 1E:
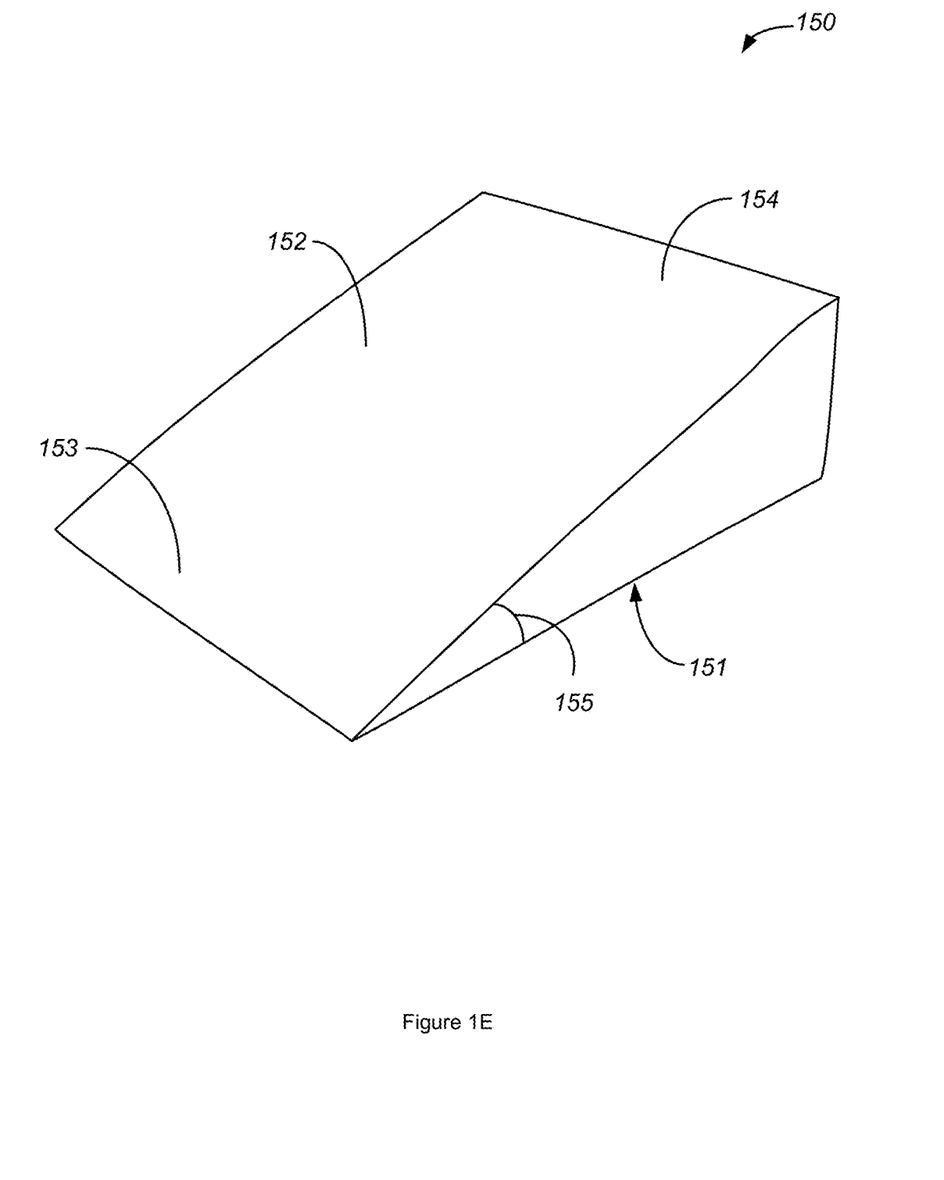
FIG. 1E shows an example of a schematic illustration of a wedge.

FIG. 1E shows an example of a schematic illustration of a wedge. A wedge 150 includes six sides. The wedge 150 includes a first substantially planar surface 151 and a second substantially planar surface 152. A first end 153 of the wedge 150 has a first thickness and a second end 154 of the wedge 150 has a second thickness. The first thickness is less than the second thickness. The first thickness increases linearly to the second thickness. There is an angle 155 between the first substantially planar surface 151 and the second substantially planar surface 152.

The cold finger 196 is in contract with the exterior bottom of the container 191. A cold finger may be defined as a piece equipment that is used to generate a localized cold surface. The cold finger 196 is positioned such that the wedge 194 is between the cold finger 196 and the interior bottom of the container 191. In some embodiments, a heater 197 in contact with the cold finger 196 may be used to control the temperature of the cold finger 196. For example, an end 198 of the cold finger may be cooled by contacting the end 198 with liquid nitrogen. The heater 197 could then be used to heat the cold finger from the −196° C. that it would be cooled to from contact with liquid nitrogen.

When the cold finger 196 is used to cool a slurry in the container 191, the wedge 194 generates a temperature gradient along the surface of the wedge 194 in contact with the slurry. For example, the thicker end of the wedge 194 (right hand side 192 of the container 191 shown in FIG. 1C) conducts heat more slowly than the thinner end of the wedge 194 (left hand side 193 of the container 191 shown in FIG. 1C). When the slurry is cooled in the apparatus 190, the slurry proximate the thinner end of the wedge 194 will cool faster than slurry proximate the thicker edge of the wedge 194. In some embodiments, the temperature of the cold finger 196 is controlled with the heater 197 to in turn control the cooling rate of a slurry in the container 191.

In some embodiments, the apparatus 190 may include a cooling surface. The cooling surface may replace the cold finger 196. The cooling surface may serve to cool the slurry. The cooling surface may be cooled by a number of different techniques, including a refrigeration unit associated with the cooling surface. In some embodiments, the temperature of the cooling surface can be controlled.

Returning to FIG. 1B, at block 120, a slurry is deposited on the second substantially planar surface of the interior bottom of the container. Again, a slurry is generally considered to be a semiliquid mixture comprising a plurality of particles of a material suspended or dispersed in a liquid. In some embodiments, the plurality of particles comprises a metal, a ceramic, or a polymer. For example, in some embodiments, the plurality of particles comprises hydroxyapatite or alumina. Hydroxyapatite a naturally occurring mineral form of calcium apatite with a chemical formula of $Ca_{10}(PO_4)_6(OH)_2$. In some embodiments, the plurality of particles comprises substantially spherical particles or plate-like particles (i.e., platelets). In some embodiments, a largest dimension of a particle of the plurality of particles is about 0.1 microns to 20 microns, about 1 micron to 10 microns, or about 10 microns. For example, if a particle of the plurality of particles is substantially spherical, the diameter of the particle may be about 10 microns, about 1 micron to 10 microns, or about 1 micron to 20 microns. As another example, if a particle of the plurality of particles is a plate-like particle, particle may be about 0.25 to 0.75 microns thick, or about 0.5 microns thick. The plate-like particle may have a diameter of about 5 microns to 8 microns. In some embodiments, a volume percent of particles in the slurry is about 20%, about 10% to 30%, or about 10% to 50%.

In some embodiments, the liquid of the slurry comprises water, an aqueous-based liquid, or an organic liquid. For example, the liquid of the slurry may comprise an alcohol or camphene (i.e., a bicyclic monoterpene).

The liquid may include additives. In some embodiments, the liquid includes a dispersant. The dispersant may aid in distributing the particles in the liquid uniformly. The dispersant may also aid in ensuring the stability of the slurry over time. Example of dispersants that may be used when the liquid is water include ammonium polymethacrylate (e.g., Darvan C N, R. T. Vanderbilt Co., Norwalk, Conn.), sodium polymethacrylate (e.g., Darvan 7Ns, R. T. Vanderbilt Co., Norwalk, Conn.), ammonium polyacrylate (e.g., Darvan 821A, R. T. Vanderbilt Co., Norwalk, Conn.), and sodium polyacrylate (e.g., Darvan 811, R. T. Vanderbilt Co., Norwalk, Conn.).

In some embodiments, the liquid includes a binder. The binder may aid in preventing the lamellar scaffold from collapsing after the sublimation process in block 130. In some embodiments, the binder is a polymer binder. Examples of binders that may be used when the liquid is water include poly(2-ethyl-2-oxazoline) (e.g., Aquazol, International Specialty Products Inc. (ISP), Covington, Ky.) and polyvinyl alcohol (PVA).

In some embodiments, the liquid includes a lubricant. The lubricant may serve to break the close alignment of binder molecules and to deploy coiled dispersant chains adsorbed at the surfaces of the plurality of particles. An example of a lubricant that may be used when the liquid is water is poly(ethylene glycol) with molecular weights of about 1 to 20,000 (e.g., supplied from Sigma-Aldrich Chemie GmbH, Buchs, Germany).

In some embodiments, the dispersant, the binder, and the lubricant are about 0.5 weight percent to 4 weight percent, or about 1 weight percent to 2 weight percent, of the liquid. Further information about additives to a liquid of a slurry can be found in B. Delattre et al., "Unidirectional Freezing of Ceramic Suspensions: In Situ X-ray Investigation of the Effects of Additives," ACS Appl. Mater. Interfaces, 2014, 6 (1), pp 159-166, which is herein incorporated by reference.

At block 125, the cooling surface is cooled to cool the slurry at a specified cooling rate. In some embodiments, the specified cooling rate is about 1° C. per minute to 20° C. per minute or about 5° C. per minute to 10° C. per minute. The slurry begins freezing (i.e., solidifying, a phase transition in which a liquid transitions to a solid when its temperature is lowered below its freezing point), with crystals comprising the liquid first nucleating at a thinnest region of the wedge. After crystals comprising the liquid nucleate, the crystals grow horizontally along the surface of the wedge and vertically. For example, when the liquid of the slurry comprise water, the crystals comprising the liquid comprise ice. As the slurry freezes, particles of the slurry are expelled from the crystals as the crystals grow. Due to the manner in which the crystals grow, a lamellar scaffold having or consisting of a single domain is formed.

One component of the apparatus 190 shown in FIGS. 1C and 1D that is important in forming a lamellar scaffold having a single domain is the wedge 194. In some embodiments, the wedge comprises a material having a thermal conductivity of about 0.7 W/(m K) to 0.23 W/(m K), or about 0.15 W/(m K). The wedge 194 and the cold finger 196 generate a temperature gradient in the slurry that has both a vertical component and a horizontal component. If the wedge has too high a thermal conductivity, the wedge may not generate the horizontal component of the temperature gradient and a lamellar scaffold having a single domain may not be formed. For example, when the wedge has a high thermal conductivity, nucleation of crystals comprising the liquid may occur over the entire surface area or large surface area of the wedge and not be confined or limited to the thinnest region of the wedge. In some embodiments, the wedge comprises a polymer material, such as polydimethylsiloxane (PDMS), for example. In some embodiments, the wedge comprises a ceramic material. Other factors that affect the formation of a lamellar scaffold having a single domain are the angle of the wedge (i.e., the angle between the two substantially planar surfaces of the wedge) and the cooling rate of the slurry. These factors are discussed further in EXAMPLE 1, below. Further, the solid loading and any additives in the liquid may also influence the formation of a lamellar scaffold having a single domain.

At block 130, crystals comprising the liquid are removed from the lamellar scaffold with a sublimation process. In sublimation, a material changes phase from a solid phase to a gas phase without passing through a liquid phase. For example, after the slurry is frozen at block 125, the frozen article is removed from the container. At block 130, the frozen article is maintained in a frozen state and exposed to reduced pressure or a vacuum. With the crystals comprising the liquid removed, a porous lamellar scaffold remains. The lamellar scaffold may be referred to as a green body after the sublimation process is performed.

For example, when the liquid of the slurry comprises water, the liquid water is frozen to form crystals of ice at block 125. The frozen article may be maintained at a temperature below the freezing temperature of water (e.g., at a temperature of about $-25°$ C. to $-75°$ C., or about $-50°$ C.) and exposed to a vacuum (e.g., about 0.017 mbar to 0.06 mbar, or about 0.035 mbar) for the sublimation process. Under these conditions (i.e., below the freezing temperature and under vacuum), the water (i.e., the ice crystals) sublimates. Depending on the size of the frozen article, the sublimation process may be performed for about 24 hours to 72 hours, or about 48 hours.

In some embodiments, block 130 is performed after substantially all of or the entirety of the slurry deposited in the container is frozen. The size of the container, the amount of slurry deposited in the container, the liquid of the slurry, and the specified cooling rate at which the slurry is cooled determine in part the period of time for the freezing process that occurs in block 125. In some embodiments, block 125 occurs over a period of time of about 10 minutes to 3 hours.

Figure 2:
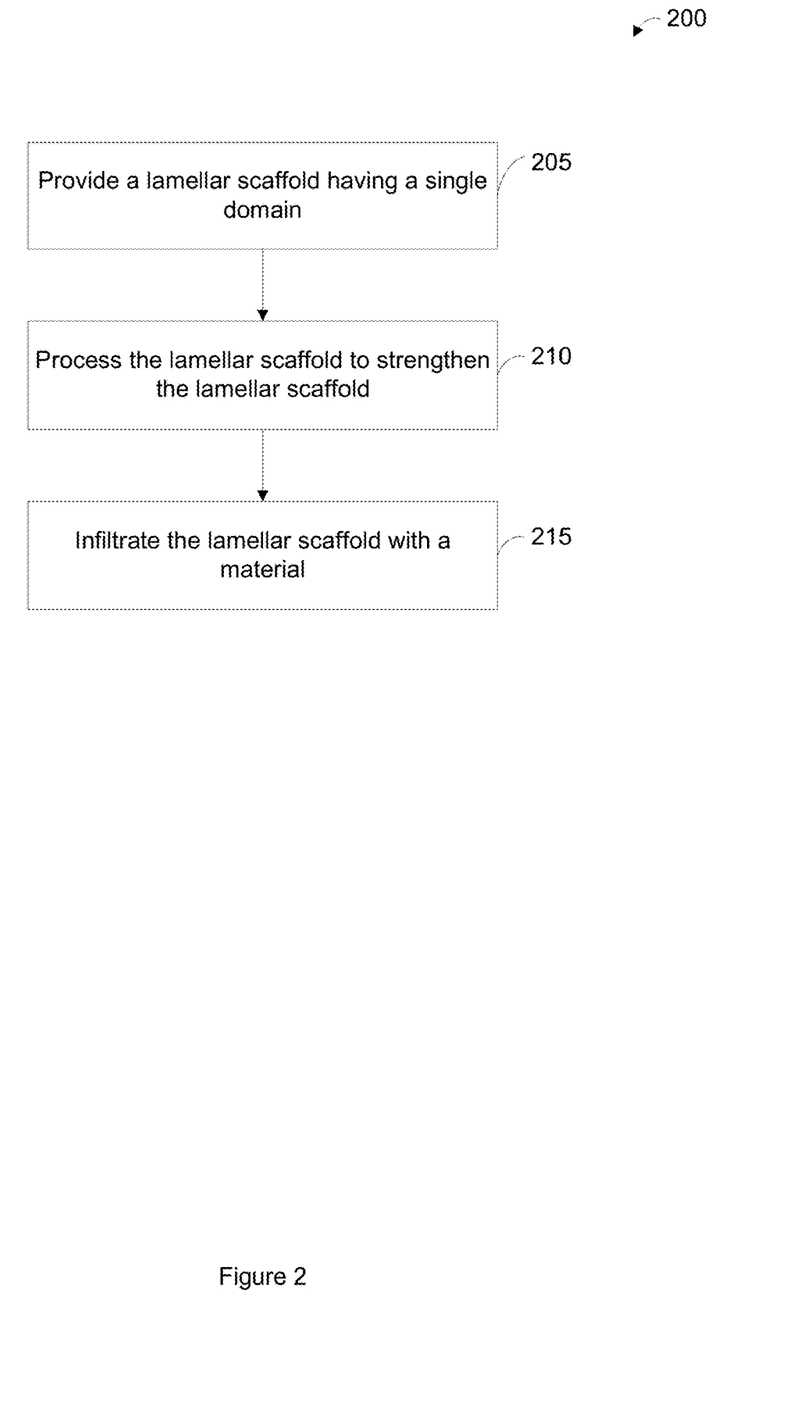
FIG. 2 shows an example of a flow diagram illustrating a manufacturing process for a composite material including a lamellar scaffold having a single domain.

In some embodiments, the lamellar scaffold generated by the method 110 is further processed to form a composite material having a lamellar structure. FIG. 2 shows an example of a flow diagram illustrating a manufacturing process for a composite material including a lamellar scaffold having a single domain. At block 205 of the method 200 shown in FIG. 2, a lamellar scaffold having or consisting of a single domain is provided. The lamellar scaffold having or consisting of a single domain may be fabricated using the method 110 shown in FIG. 1B.

A block 210, the lamellar scaffold is processed to strengthen the lamellar scaffold. For example, after the sublimation process at block 130 of the method 110 shown in FIG. 1B, the lamellar scaffold may be weak. That is, particles comprising the lamellar scaffold may be held together by surface forces between the particles of by a binder that was in the liquid of the slurry. The process performed at block 210 serves to strengthen the lamellar scaffold. For example, when the particles of the lamellar scaffold comprise a metal or a ceramic, the lamellar scaffold may be sintered. Sintering includes heating the lamellar scaffold without melting it to fuse or bind the particles of scaffold. As another example, when the particles of the lamellar scaffold comprise a polymer, the lamellar scaffold may be exposed to an elevated temperature or to a radiation source (e.g., electron beam exposure, gamma-radiation, or ultraviolet (UV) light) to cross-link the polymer of the particles and to further bind the particles of the scaffold.

At block 215, the lamellar scaffold is infiltrated with a material. In some embodiments, the material with which the lamellar scaffold is infiltrated comprises a polymer, a ceramic, or a metal. For example, heat and pressure may be used to infiltrate the lamellar scaffold with a material. The operation at block 215 produces a lamellar material comprising the material of lamellar structure and the material that is infiltrated into the lamellar structure. For example, to form a polymer/ceramic lamellar material, a ceramic lamellar structure may be fabricated and then the ceramic lamellar structure may be infiltrated with a polymer. As another example, to form a lamellar metal/ceramic material, a ceramic lamellar structure may be fabricated and then the ceramic lamellar structure may be infiltrated with a metal.

The following examples are intended to be examples of the embodiments disclosed herein, and are not intended to be limiting. To illustrate the breakup of the temperature gradient into vertical and horizontal components during freezing in these examples, the expression "dual temperature gradients" is used, although the resulting combined temperature gradient is actually singular. This allows the crystals comprising the liquid (e.g., ice crystals) to grow both vertically and horizontally, which is critical for obtaining large-scale aligned lamellar structures.

Example 1

This example compares conventional (i.e., unidirectional) and bidirectional freeze casting. In this example, the slurry that was freeze cast was prepared by mixing distilled water with hydroxyapatite (HA) powder (density, 3.15 g/cm$^3$; d50 (median particle) size, 2.424 μm; 20 volume %), 1 weight % of sodium polyacrylate (e.g., Darvan 811 (R.T. Vanderbilt Co., Norwalk, Conn.)) as dispersant, 1 weight % of poly (ethylene glycol) as lubricant, and 2 weight % of poly(2-ethyl-2-oxazoline) (e.g., Aquazol (International Specialty Products Inc. (ISP), Covington, Ky.)) with a molecular weight of 50,000 g/mol as binder. The slurry was ball-milled for around 24 hours.

For the bidirectional freeze-casting apparatus, the cooling stage comprised a liquid nitrogen tank and a copper rod, on top of which a Teflon mold (18 mm×18 mm×40 mm), along with a PDMS wedge and a copper plate, was placed. A ring heater, coiled around the copper rod, was linked to a power unit controlling the cooling rate. Thermocouples were inserted through the Teflon mold walls and connected to a computer to record the slurry temperature in situ at specific locations. After the slurry was poured into the mold, the temperature of the copper plate was progressively decreased at a controlled rate. When completely frozen, the sample was tapped out of the mold and freeze-dried for more than 48 hours at $-50°$ C. with 0.035-mbar pressure. For sintering, an air furnace was used to sinter the green bodies (4 hours at 1300° C.).

Comparison Between Conventional and Bidirectional Freeze-Casting Methods.

Figure 3A:
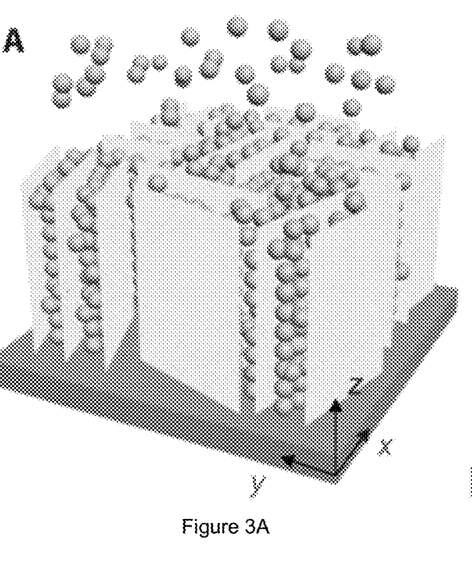
FIG. 3A-3F show examples of schematic illustrations of and the resulting scaffolds generated by conventional freeze casting and bidirectional freeze casting.
Figure 3B:
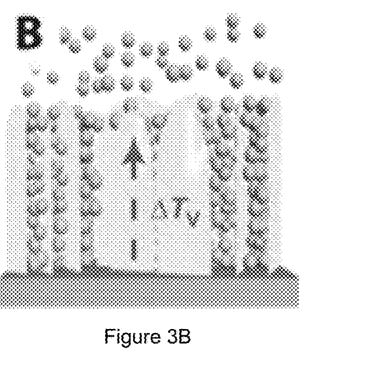
Figure 3C:
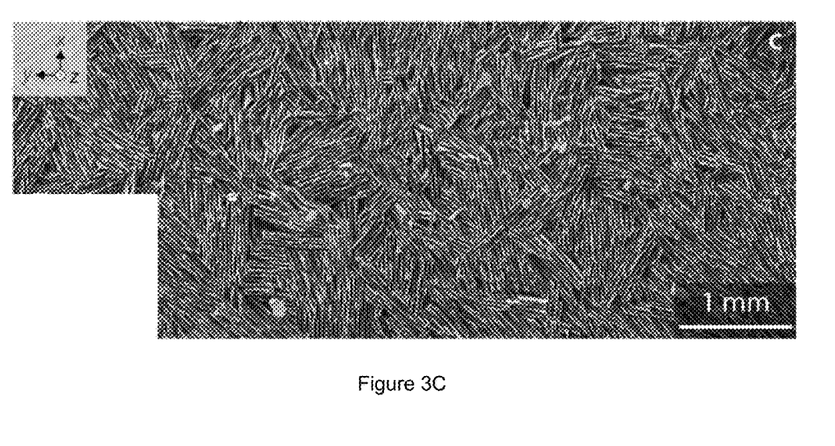

FIGS. 3A-3F show a comparison between unidirectional and bidirectional freeze-casting techniques and their corresponding lamellar structures. In both cases, the same slurry with 20 volume % of hydroxyapatite (HA) particles dispersed in water was used. Representative scaffolds shown in scanning electron microscopy (SEM) images in FIGS. 3C and 3F were prepared from the HA slurry using a cooling rate of 5° C./min. For the conventional unidirectional freeze-casting technique, the slurry was poured into a Teflon mold that was placed directly in contact with the cold finger (copper plate) (FIG. 3A). When the cold finger temperature decreased, a single vertical temperature gradient ($\Delta T_V$) was created, forcing ice crystals to grow preferentially from the bottom to the top (FIG. 3B). However, because the nucleation of ice crystals occurred randomly all over the cold finger surface, that is, nucleation in 2D, the final structure revealed multiple submillimeter domains corresponding to various orientations of ice crystals in the plane parallel to the copper plate. These domains could be easily observed in the horizontal cross section of the HA scaffold, as shown by the SEM image (FIG. 3C). Although the approach of a patterned cold finger and "freezing under flow" have been previously applied to further manipulate the orientation of the ice crystals, it turned out that only a limited extent of alignment (2 mm or 4 mm) was obtained in the plane parallel to the cold finger.

Figure 3D:
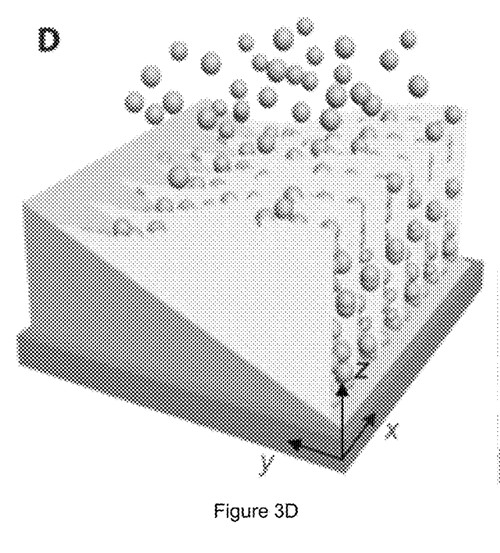
Figure 3E:
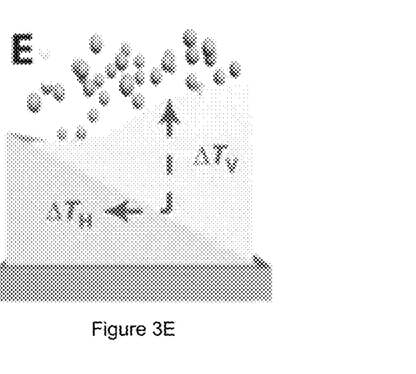
Figure 3F:
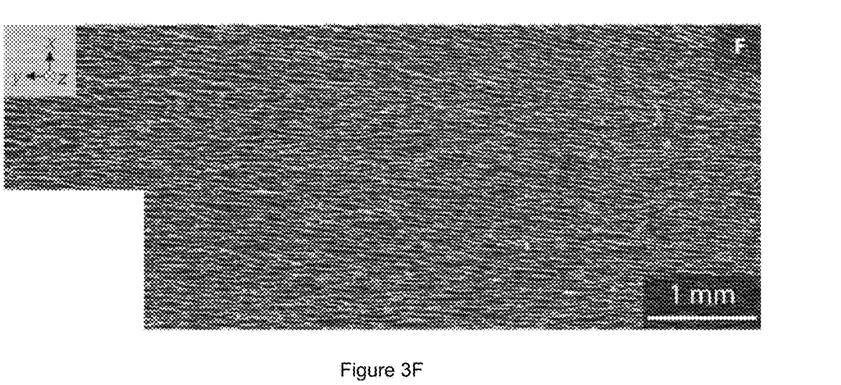

For the bidirectional freeze-casting technique described herein, PDMS wedges with different slopes were used to separate the cold finger from the slurry (FIG. 3D). On cooling, the bottom end of the wedge has a lower temperature than the top end. By proper adjustment of the cooling rate, two temperature gradients, that is, vertical ($\Delta T_V$) and horizontal ($\Delta T_H$), were generated at the same time (FIG. 3E). Under such conditions, the slurry started freezing in a gradient manner from the bottom to the top of the wedge, with ice crystals nucleating only at the bottom end of the wedge, that is, "nucleation in 1D," and growing preferentially in two directions: vertically away from the cold finger and horizontally along the PDMS wedge. As a result, after sublimating and sintering, a large-scale monodomain lamellar structure was obtained. From a horizontal cross section of HA scaffold, the long-range order is clearly apparent, as seen in the SEM image in FIG. 3F. The specimen size, as large as 25 mm, is limited only by the size of the mold. This demonstrates that bidirectional freeze casting can generate ordering in two directions, whereas unidirectional freeze casting is limited to only one direction. From the perspective of making high ceramic fraction composites, such large-scale aligned structures, after being pressed and infiltrated with a polymer, would be superior to those obtained by conventional freeze casting.

Figure 4A:
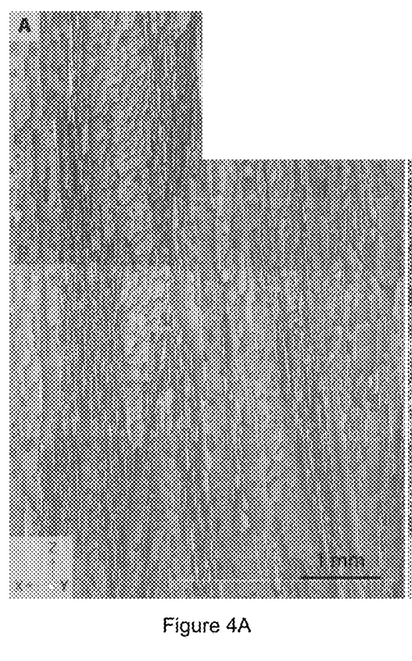
FIGS. 4A and 4B show examples of SEM images of scaffolds in the cross-section perpendicular to the cold finger generated by conventional freeze casting and bidirectional freeze casting.
Figure 4B:
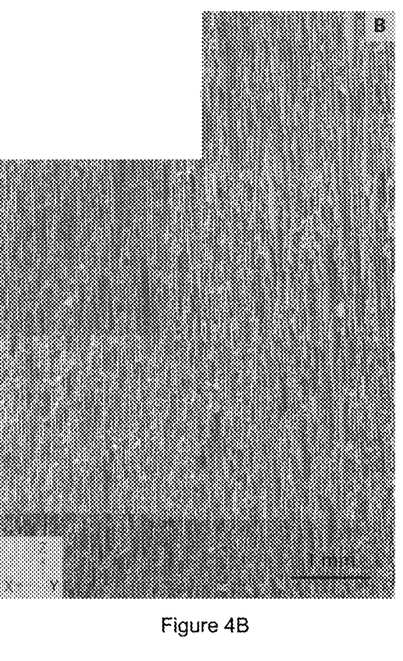

FIGS. 4A and 4B show examples of SEM images of scaffolds in the cross-section perpendicular to the cold finger generated by conventional freeze casting and bidirectional freeze casting. FIG. 4A shows a sample prepared by conventional freezing and FIG. 4B shows a sample prepared by bidirectional freezing. FIG. 4A shows that as ice crystals only grow under the vertical temperature gradient, the lamellar structure has many domains with different orientation. FIG. 4B shows that as ice crystals grow under dual temperature gradients, the lamellar structure has only one domain that aligns along the wedge. The samples were both prepared with a 20 volume % HA slurry, using a cooling rate of 10° C./minute. A PDMS wedge ($\alpha=20°$) was used for bidirectional freezing.

Effect of Slope Angle and Cooling Rate on Structural Alignment.

Because cooling rate greatly affects the freeze-cast structure generated, bidirectional freeze-casting experiments were performed at different cooling rates (1° C./min, 5° C./min, and 10° C./min) with various slope angles of PDMS wedges (0°, 5°, 10°, and 20°). Here, $\alpha=0°$ represents a flat PDMS film with a thickness of ~1 mm. A 20 volume % HA slurry was used in all experiments. Scaffolds were then cut in the direction parallel to the cold finger, and the microstructure was observed with SEM. The domain orientations fluctuated significantly, depending on the experimental conditions, specifically, the cooling rate and the wedge angle. Fourier transform images illustrated the global domain orientation over the whole cross section. At the lowest cooling rate of 1° C./min, no long-range alignment was observed regardless of the wedge angle. At higher cooling rates (5° C./min and 10° C./min), the alignment started to become more uniform when the PDMS wedge angle was increased from $\alpha=0°$ to 20°, that is, domain sizes became larger and approached that of the whole sample size. In other words, multiple domains were observed for $\alpha=0°$ at both cooling rates of 5° C./min and 10° C./min, whereas the alignment was largely improved for $\alpha=20°$. Eventually, under specific conditions ($\alpha=20°$, 5° C./min or 10° C./min), a monodomain structure characterized by a single orientation across the whole sample, horizontally to the cold finger, was obtained.

Direct Observation of Ice Profile Propagation.

To further investigate the bidirectional freezing, and in particular the nucleation process, the ice-front propagation using a high-speed charge-coupled device (CCD) camera was recorded. Every experiment was performed with the same 20 volume % HA slurry at a fixed cooling rate of 5° C./min, but with different slope angles: $\alpha=0°$, 5°, 10°, and 20°. Image sequences were taken at different time scales to compare the ice-front profile evolution in terms of shape but independent of the ice-front speed. In practice, the higher the cooling rate, the earlier the top of the wedge is reached by the ice front. Because $\alpha=0°$ yields a single vertical temperature gradient, the slurry simultaneously nucleated all over the PDMS film ("nucleation in 2D"), generating a horizontally flat ice-front profile, which persisted throughout the freezing process. Slope angles of 5°, 10°, and 20° were able to generate two temperature gradients: vertical ($\Delta T_V$) and horizontal ($\Delta T_H$). Consequently, slurry solidification started at the bottom and then propagated to the top of the wedge. The ice nucleation was initiated at the thinnest edge of the PDMS wedge (nucleation in 1D), in contrast to the nucleation in 2D when $\alpha=0°$. Once nucleation was completed, ice propagated not only vertically but also horizontally along the PDMS wedge ("directed growth under dual $\Delta T$"), resulting in a wavy ice front profile.

The shape of such an ice profile can be understood in several stages. At the beginning, because of the low PDMS thermal conductivity, ice only nucleates at the thinnest part of the wedge. At this stage, the supercooling effect makes the ice crystals promptly grow upward and along the PDMS wedge. Gradually, the other part of the PDMS surface also becomes cold, which speeds up freezing along the PDMS surface. After the whole PDMS surface is frozen, ice crystals can only grow upward, limited by the mold. However, the ice-front profile became gradually flatter, indicating that the effect of PDMS wedge thickness becomes less obvious when ice is growing far enough from the cold finger. The effect of the cooling rate on ice-front profile during bidirectional freeze casting was also investigated using a PDMS wedge with an angle of $\alpha=10°$.

Evidence of Unique Ice Nucleation and Growth Under Dual Temperature Gradients.

Scaffolds prepared by conventional and bidirectional freezing were cut vertically to the cold finger to observe and compare the differences in the ice nucleation and growth mechanisms. For conventional freeze casting, a disordered region is commonly observed at the bottom of the scaffold. This results from ice crystals that nucleate and quickly grow in the supercooled region close to the cold finger. However, for bidirectional freezing, this disordered structure is only observed in the vicinity of the bottom of the wedge and indicates that the nucleation is now restricted to this zone. It is noteworthy that the lamellar structure at this location is not aligned horizontally. When observing the middle cross section of a scaffold prepared by bidirectional freezing, only a lamellar structure, well aligned horizontally along the wedge, can be observed. These observations indicate that the nucleation and growth mechanism are substantially different for conventional and bidirectional freezing, that is, "nucleation in 2D and directed growth under single $\Delta T$" and "nucleation in 1D and directed growth under dual $\Delta T$," respectively.

Further experiments were performed with thermocouple probes placed on opposite walls of a mold at positions corresponding to the height of the wedge. Temperatures were recorded during a freeze-casting operation. Observations from these experiments further support the mechanism of bidirectional freeze casting: ice crystals grow preferentially under both vertical and horizontal gradients. These highly oriented ice crystals could thus be used as a template to assemble building blocks into a large-scale aligned lamellar structure.

Example 2

This example describes a material that can be fabricated with the methods and apparatus described herein. Using the bidirectional freeze-casting method described in Example 1, a hydroxyapatite (HA) scaffold with long-range aligned lamellar structure was prepared by bidirectional freezing. The scaffold was then further densified and infiltrated with a compliant layer (PMMA) to generate a nacre-mimetic composite as large as 4 mm×8 mm×25 mm (currently limited by the size of the mold, although theoretically scalable). This composite can reach ceramic contents as high as 75-85 volume % which was controlled by pressing the scaffold to different thicknesses. In comparison to its constituent materials, the composite displays a combination of mechanical properties of an elastic modulus on the order of 20 GPa, a bending strength of ≈100 MPa, with a work of fracture as high as 2075 J m$^{-2}$ (some 100 times higher than monolithic HA). Hydroxyapatite is not a structural ceramic, but was chosen here due to its well-documented combination with PMMA. Having said that, these properties make this composite a candidate as a bone substitute in orthopedic applications when compared to similar HA-based composites reported in literature, which show at best a maximum HA volume of ≈50%, an elastic modulus of 13 GPa with a bending strength of 92 MPa. It is also believed that the design principles and processing strategies utilized here can be transferred to more structural composites where a higher level of control over structure is needed.

The fabrication process used to make the nacre-mimetic HA/PMMA composites is described below. First, an HA scaffold with long-range aligned lamellar structure was fabricated using a bidirectional freezing method. A 20 volume % HA slurry was prepared by mixing distilled water with hydroxyapatite powders (density=3.15 g cm$^{-3}$, d50 (median particle) size=2.424 μm, 20 volume %), 1 weight % of sodium polyacrylate (e.g., Darvan 811, R. T. Vanderbilt Co., Norwalk, Conn.), 1 weight % of poly(ethyl glycol), and 2 weight % of poly(2-ethyl-2-oxazoline) (e.g., Aquazol polymer (International Specialty Products Inc. (ISP), Covington, Ky.)) with a molecular weight of 50 000 g mol$^{-1}$. The slurry was ball-milled for at least 24 h and de-aired in a vacuum desiccator before freezing. The slurry was then poured into a square plastic mold (18 mm×18 mm×40 mm) with a PDMS wedge at the bottom. This was placed on a copper cold finger connected to a liquid nitrogen reservoir. The wedge generated a horizontal temperature gradient, perpendicular to the vertical gradient from the cold finger. During the freezing process, lamellar ice crystals grew preferentially under dual temperature gradients, i.e., a vertical gradient away from the cooling stage and a horizontal gradient from the thinner end to the thicker end of the PDMS wedge, generating a long-range aligned lamellar structure. Simultaneously, HA particles were expelled and assembled to replicate the structure of ice crystals. As lamellar ice crystals grew preferentially along the dual temperature gradients, HA particles were expelled from the freezing slurry into the space between the crystals in a similar lamellar pattern. The frozen ice crystals were then sublimated out (−50° C., below 0.035 mbar) for over 48 h, leaving behind a porous HA scaffold that was sintered at 1300° C. for 4 h.

Figure 5A:
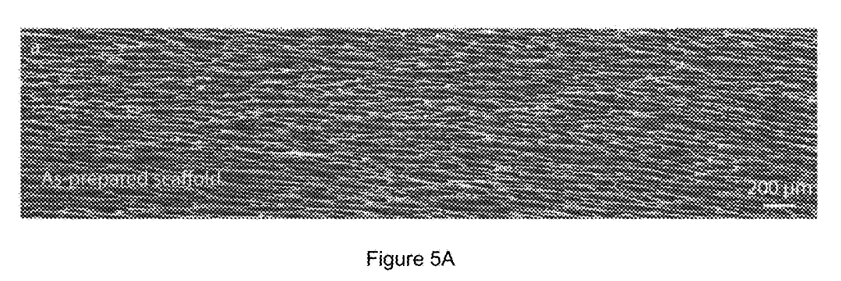
FIGS. 5A-5D show examples of SEM images at various stages in a method of making a hydroxyapatite (HA)/poly (methyl methacrylate) (PMMA) composite.

FIGS. 5A-5D show examples of SEM images at various stages in a method of making a hydroxyapatite (HA)/poly (methyl methacrylate) (PMMA) composite. FIG. 5A shows a SEM image of a HA scaffold after the bidirectional freeze-casting process. The unpressed HA scaffold contained a long-range aligned lamellar structure that resulted from bidirectional freezing; this is very difficult to achieve by conventional freeze casting. The scaffolds exhibited some 70% porosity, i.e., their ceramic volume fraction was only ≈30%.

Figure 5B:
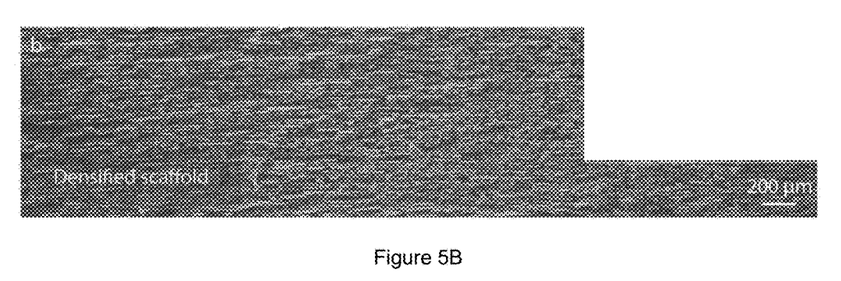
Figure 5C:
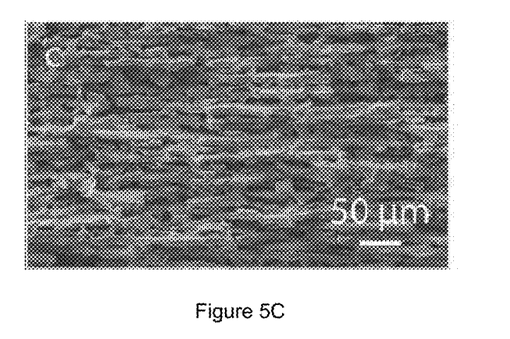

The HA scaffolds were subsequently uniaxially pressed to increase the mineral density; the resulting densified scaffolds had ≈15%-25% porosity to give a desired ceramic content of ≈75-85 volume %. FIGS. 5B and 5C show SEM images of a HA scaffold after the uniaxial pressing. The uniaxial pressing also served to break up the lamellar structure into separate bricks, mimicking nacre's "brick-and-mortar" architecture but without the "mortar." The separate ceramic "bricks" measured ≈5-20 μm thick and ≈10-110 μm long as shown in FIGS. 5B and 5C.

The final step in creating the nacre-mimetic HA/PMMA composite involved infiltrating a grafted HA scaffold with methyl methacrylate (MMA) which was in situ polymerized into PMMA. As it is known that the interface between the ceramic bricks and compliant layer is crucial for the mechanical properties of these composites, the densified scaffold was grafted with 3-(trimethoxysilyl)propyl methacrylate (γ-MPS) to allow the methacrylate groups to further react with monomer during the successive infiltration step and strengthen the interfaces. The grating process was performed by immersing the as-prepared HA scaffold into a 1 weight % γ-MPS/ethanol solution for 24 h. Following the grafting process, the scaffold was dried at 80° C. for 2 h and infiltrated through in situ polymerization of MMA initiated by 0.5 weight % of 2,2-azobisisobutyronitrile (AIBN) at 40° C. After 24 h, the composite was treated at 90° C. for another 2 h to guarantee full polymerization.

Figure 5D:
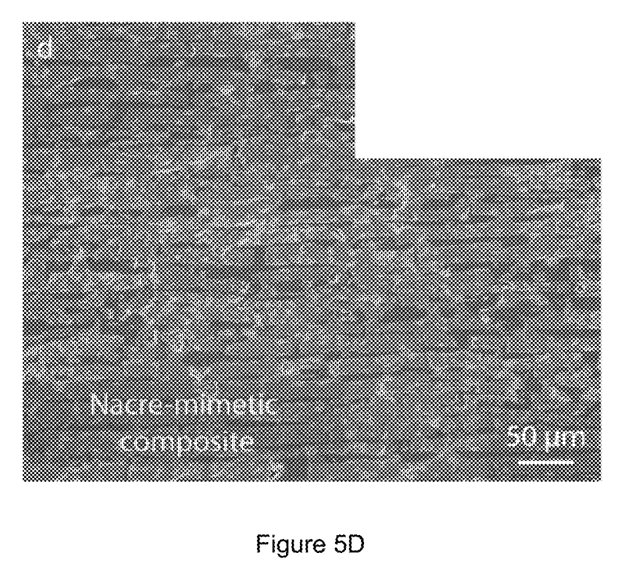

FIG. 5D shows a SEM image of the final HA/PMMA composite. The final HA/PMMA composites displayed a hierarchical architecture (with 75-85 volume % ceramic content) over several length-scales. Specifically, the inorganic bricks can be seen to be parallel, closely packed, and homogeneous throughout the whole sample due to the bidirectional freezing method. The asperities and roughness of the bricks further mimic the inorganic bridges between aragonite platelets found in nacre. Each layer of bricks is separated by polymer layers with thicknesses ranging from sub-micrometer to several micrometers. All these structural features are critical for the mechanical performance found in nacre.

CONCLUSION

Further details regarding the embodiments disclosed herein can be found in H. Bai et al., "Bioinspired large-scale aligned porous materials assembled with dual temperature gradients," Science Advances, 11 Dec. 2015, Vol. 1, no. 11, e1500849 and H. Bai et al., "Bioinspired Hydroxyapatite/Poly(methyl methacrylate) Composite with Nacre-Mimetic Architecture by a Bidirectional Freezing Method," Adv. Mater., 28: 50-56, 2016, both of which are hereby incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
   providing an apparatus, the apparatus comprising:
   a container, a bottom of the container comprising a wedge, the wedge comprising a first substantially planar surface and a second substantially planar surface with an angle between the first and the second substantially planar surfaces, an interior bottom of the container comprising the second substantially planar surface, and
   a cooling surface, the cooling surface being in contact with the first substantially planar surface;
   depositing a slurry on the second substantially planar surface, the slurry comprising a plurality of particles in a liquid; and
   cooling the cooling surface to cool the slurry at a specified cooling rate, crystals comprising the liquid first nucleating at a first end of the wedge, the first end of the wedge comprising a thinnest region of the wedge, the wedge creating a two-dimensional temperature gradient including a vertical temperature gradient from the bottom to a top of the container and a horizontal temperature gradient along the wedge, particles of the slurry being expelled from the crystals as the crystals grow along the vertical temperature gradient and the horizontal temperature gradient and forming a lamellar scaffold having a single domain.

2. The method of claim 1, wherein the first end of the wedge has a first thickness, wherein a second end of the wedge has a second thickness, wherein the first thickness is less than the second thickness, and wherein the first thickness increases linearly to the second thickness.

3. The method of claim 1, wherein the angle between the two substantially planar surfaces is about 1° to 40°.

4. The method of claim 1, further comprising:
   removing the crystals comprising the liquid from the lamellar scaffold with a sublimation process.

5. The method of claim 1, wherein the wedge comprises polydimethylsiloxane (PDMS).

6. The method of claim 1, wherein the wedge comprises a material with a thermal conductivity of about 0.7 W/(m K) to 0.23 W/(m K).

7. The method of claim 1, wherein a volume percent of particles in the slurry is about 10% to 50%.

8. The method of claim 1, wherein particles of the plurality of particles are substantially spherical, and wherein the particles of the plurality of particles are about 0.1 microns to 20 microns in diameter.

9. The method of claim 1, wherein the plurality of particles comprise a metal, a polymer, or a ceramic.

10. The method of claim 1, wherein the plurality of particles comprise hydroxyapatite.

11. The method of claim 1, wherein the slurry further comprises a dispersant, a binder, and a lubricant.

12. The method of claim 1, wherein the liquid of the slurry comprises water, and wherein the crystals comprising the liquid comprise ice.

13. The method of claim 1, further comprising:
   removing the crystals comprising the liquid from the lamellar scaffold with a sublimation process;
   processing the lamellar scaffold to strengthen the lamellar scaffold; and
   infiltrating the lamellar scaffold with a material.

14. The method of claim 13, wherein processing the lamellar scaffold to strengthen the lamellar scaffold comprises sintering the lamellar scaffold.

15. The method of claim 1, wherein the specified cooling rate is about 1° C. per minute to 20° C. per minute.

16. The method of claim 1, wherein during the cooling of the cooling surface to cool the slurry at a specified cooling rate, all of the liquid of the slurry is frozen.

17. The method of claim 1, wherein cooling the cooling surface to cool the slurry at a specified cooling rate occurs over a period of time of about 10 minutes to 3 hours.

18. The method of claim 1, wherein cooling the cooling surface to cool the slurry at the specified cooling rate is performed after depositing the slurry on the second substantially planar surface.

19. A method comprising:
   providing an apparatus, the apparatus comprising:
   a container, a bottom of the container comprising a wedge, the wedge comprising a first substantially planar surface and a second substantially planar surface with an angle between the first and the second substantially planar surfaces, an interior bottom of the container comprising the second substantially planar surface, and
   a cooling surface, the cooling surface being in contact with the first substantially planar surface;
   depositing a slurry on the second substantially planar surface, the slurry comprising a plurality of particles in a liquid; and
   after depositing the slurry, cooling the cooling surface to cool the slurry at a specified cooling rate, crystals comprising the liquid first nucleating at a first end of the wedge, the first end of the wedge comprising a thinnest region of the wedge, particles of the slurry being expelled from the crystals as the crystals grow and forming a lamellar scaffold having a single domain.

* * * * *